Figure 1:
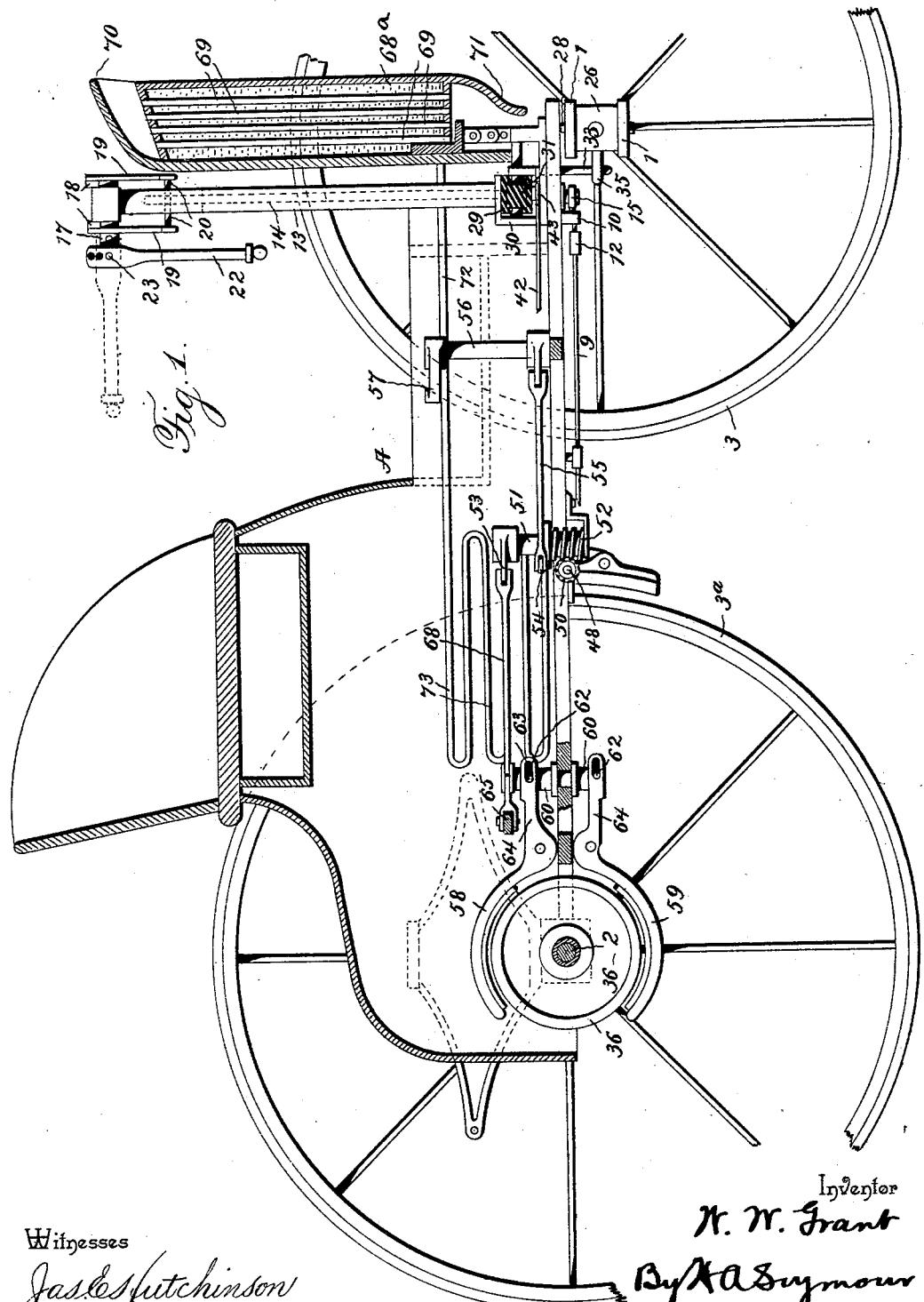

(No Model.)

W. W. GRANT.
MOTOR VEHICLE.

3 Sheets—Sheet 1.

No. 602,621.

Patented Apr. 19, 1898.

Witnesses
Jas. E. Hutchinson
G. F. Downing

Inventor
W. W. Grant
By A. A. Seymour
Attorney

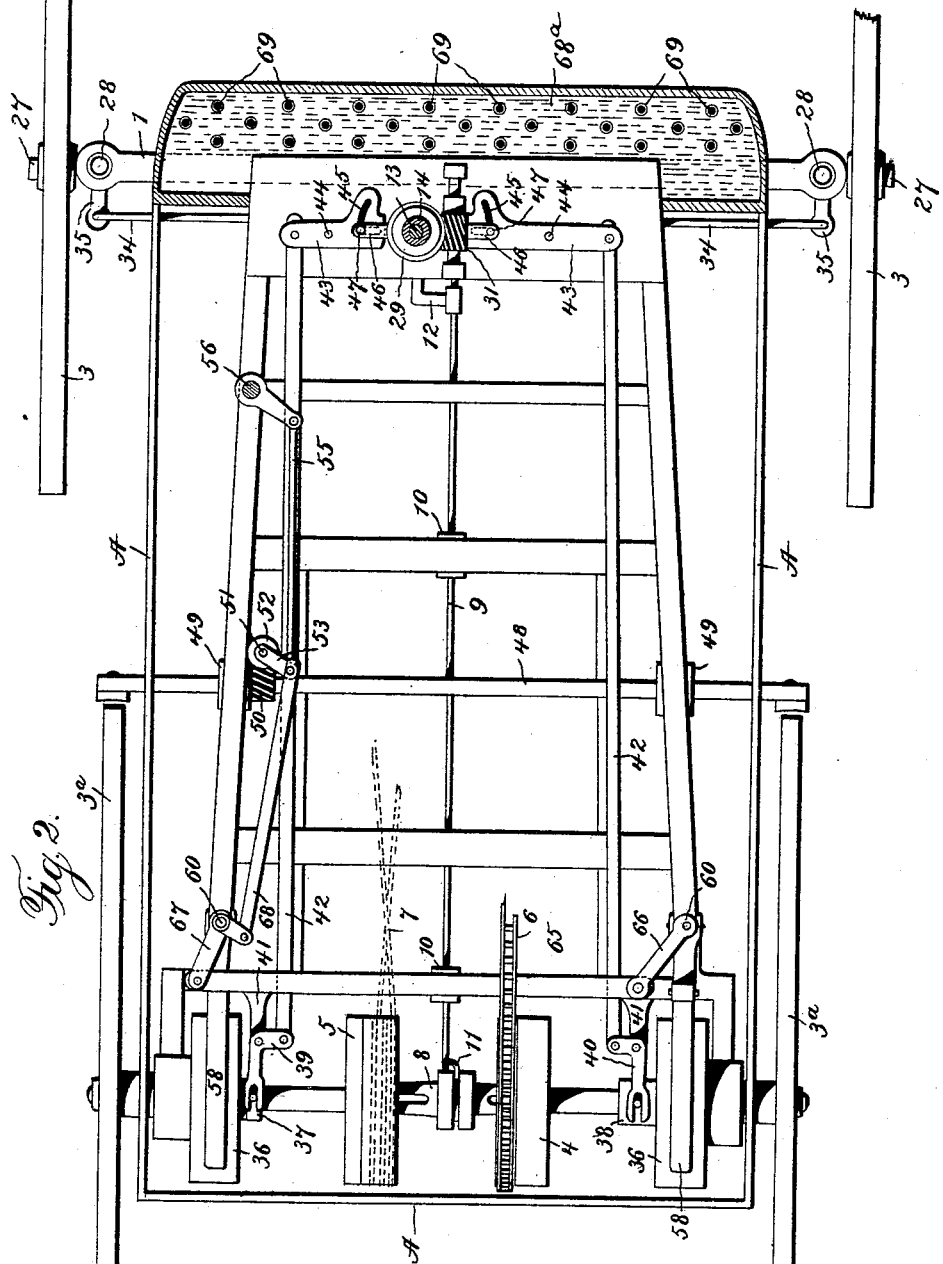

(No Model.) 3 Sheets—Sheet 3.
W. W. GRANT.
MOTOR VEHICLE.
No. 602,621. Patented Apr. 19, 1898.
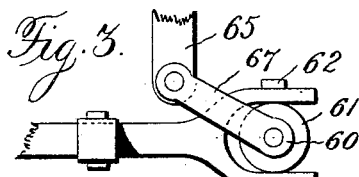
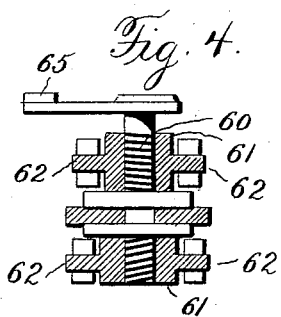
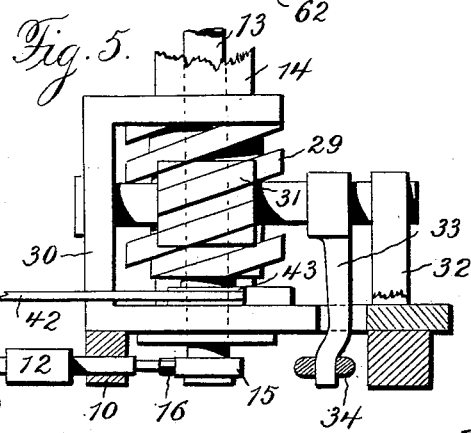
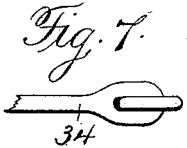
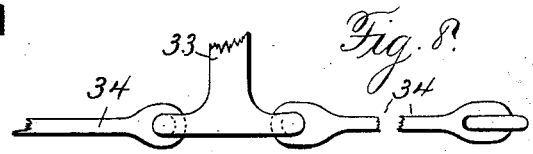
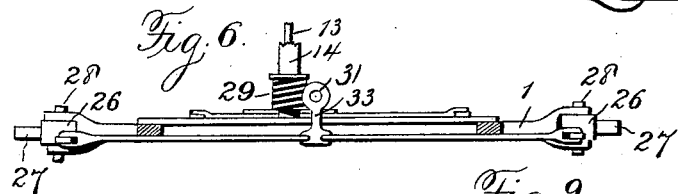
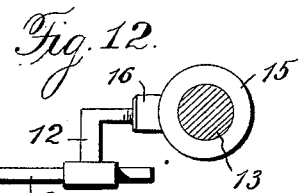
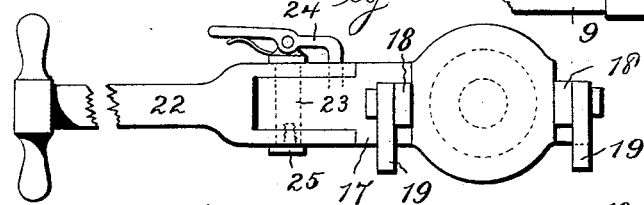
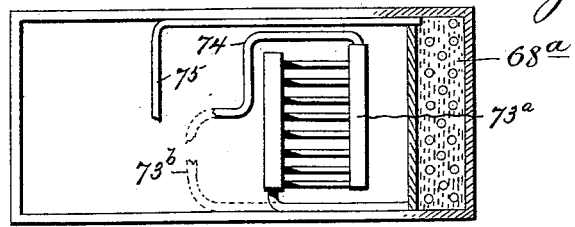
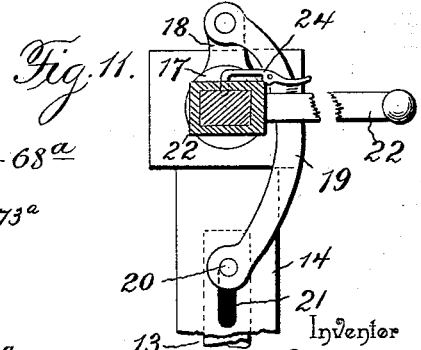
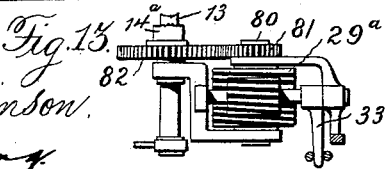
Witnesses
Jas E Hutchinson
G. F. Downing
Inventor
W. W. Grant
By H. A. Seymour
Attorney

UNITED STATES PATENT OFFICE.

WILLIAM WALLACE GRANT, OF BROOKLYN, NEW YORK.

MOTOR-VEHICLE.

SPECIFICATION forming part of Letters Patent No. 602,621, dated April 19, 1898.

Application filed November 26, 1895. Serial No. 570,183. (No model.)

*To all whom it may concern:*

Be it known that I, WILLIAM WALLACE GRANT, a resident of Brooklyn, in the county of Kings and State of New York, have invented certain new and useful Improvements in Vehicles; and I do hereby declare the following to be a full, clear, and exact description of the invention, such as will enable others skilled in the art to which it appertains to make and use the same.

My invention relates to a road-vehicle of that type or character designed to be propelled by a motor carried upon or about the said vehicle, and while my herein-described vehicle can be adapted to the employment of any motor that class of engine known as the "gasolene-engine," or such as employ hydrocarbon for the generation of required energy, is the type preferred.

The objects of my invention are to provide means for steering the vehicle and to obviate at the same time the danger of having the guiding-lever wrenched from the hand by sudden or unexpected contact of the wheels with interposing obstruction.

Another object is to have the steering-wheels locked in the position to which they are brought and to unlock only at the will of the operator, thus making it a matter of no consequence whether the operator's hand be on the guiding-lever, except to operate it, as interposing obstructions in the path of the wheels cannot turn the steering-wheels, and therefore cannot operate the steering-lever.

Another object is to apply one or more brakes, so that the said brake or brakes will remain locked in the position placed until relieved or unlocked at the will of the operator.

Another object is to provide a means (through which guiding or steering of the vehicle is promoted) detachably connected by which easy access of passengers to and from the seat adjacent becomes practical.

Another object is to provide means for rapid cooling of the jacket-water circulated about the engine-cylinder, whereby a smaller quantity of such cooling-water will be required to be carried upon or about the vehicle.

Another object is to provide means for engaging and releasing clutches, as directions pursued by the vehicle may require, as well as for steering or stopping the said vehicle.

For the purposes of safety in steering and locking of the steering mechanism and for applying and locking of the brakes I have availed myself of the properties presented by the screw, and for water-cooling by forcing a current of air through pipes surrounded by the water, (whose heat is to be dissipated,) or by passing pipes surrounding water to be cooled through a body of air, or by these taken together.

My invention further consists in certain novel features of construction and combinations of parts, which will be hereinafter described, and pointed out in the claims.

In the accompanying drawings, Figure 1 is a view in vertical longitudinal section. Fig. 2 is a plan view in horizontal section. Figs. 3, 4, 5, 6, 7, 8, 9, 10, 11, 12, and 13 are enlarged details.

A represents the frame or lower line of the body of the vehicle.

B is the running-gear-frame-supporting mechanism and vehicle-body.

1 and 2 are the front and rear axles, respectively, and 3 $3^a$ are the wheels upon which the vehicle is mounted.

As the invention comprises propelling mechanism, steering mechanism, brake mechanism, and water-cooling mechanism, as well as other subsidiary mechanism, I will proceed to describe them in the order named.

A pair of drums 4 and 5 are loosely mounted on the rear axle 2. One of these drums is furnished with sprocket-teeth, and over it a sprocket-chain 6 passes to the motor, (not shown,) and through this mechanism the vehicle is propelled forward when it is desired to run the vehicle forward. Over the other drum a cross-belt 7 is passed, the latter also extending to the motor (by which it may be driven) to reverse or back the vehicle when the exigency arises. This drum may have a plain face, or be provided with one or more grooves, or otherwise constructed for the employment of a cross belt, rope, or chain, driven from a correspondingly-faced wheel upon the motor's drive-shaft. These two drums 4 and 5 have internal clutches of a character similar to those disclosed in Letters Patent No.

552,757, granted to me January 7, 1896, and one or the other may be clutched in by means of the intermediate clutch-section 8, interposed between the drums, accordingly as the vehicle is to be propelled forward or backward, or both drums may be left unclutched when the vehicle is standing; but when the vehicle is provided with a motor adapted to run both ways and a reverse direction imparted to the vehicle by reversing the motor then the grooved drum and belt, rope, or chain operating in connection therewith may be omitted. This clutch section or sleeve 8 is controlled by the rock-shaft 9, extending longitudinally of the vehicle, preferably from its forward end to its rear, in boxes 10 10, beneath the body of the vehicle. This rock-shaft is provided with a crank-arm 11 at its rear end, by means of which the clutch-section 8 is shifted. This shaft is also furnished with an arm 12 at its forward end, by means of which the shaft is rocked. Rock-shaft 9 is oscillated by means of a vertical shaft 13, which extends upwardly through a hollow shaft 14 at a position in front of the operator. The lower end of this shaft 13 has a collar 15 loosely mounted thereon, and this collar is furnished with a slotted bearing 16, having loose engagement with the arm 12. The vertical shaft 13 is adapted to be slid vertically, and by so doing the rock-shaft 9 is oscillated and the clutch-section 8 shifted to the right or left to cause the vehicle to move forward or backward or to prevent the application of power altogether. This vertical shaft is raised and lowered through the agency of a short horizontal shaft 17, mounted in the upper end of hollow shaft 14. Said shaft 17 has a pair of lugs 18 18 projecting therefrom, one on each side of the hollow shaft 14, and a pair of curved links 19 19, pivotally connected, (one with each lug,) extend downward, and they are pivotally connected at their lower ends with the shaft 13 by means of pins 20 20, the slots 21 21 being provided for these pins. So by rocking the short shaft 17 all this mechanism is controlled, whether it be to cause the vehicle to move forward or backward or to have the power removed or cut out from driving engagement with the vehicle. A handle 22 is employed for the operation of these parts, it being connected to the shaft 17. This handle extends backward, as indicated by dotted lines, (when the vehicle is in operation,) in position to be manipulated by the operator, and as it is in this position more or less in the way of persons getting in or out of the vehicle provision is made for swinging it up or down out of the way, as indicated by dotted and full lines in Fig. 1. To this end the handle is pivotally connected by bolt 23 with shaft 17, and a spring-catch 24 is pivoted to this bolt and adapted to enter holes in the handle and shaft to lock them together in position, as shown in Fig. 9. To prevent surreptitious manipulation of the vehicle in the event of the motorman or occupants being away, provision is made for detaching the handle that the operator may, when so disposed on leaving the vehicle, retain the handle in his possession. This is done in any convenient manner—as, for instance, by making the bolt 23 removable, the nut or screw 25 being detachably connected with the bolt. Hence to remove the handle it is only requisite to remove this nut or screw and withdraw the bolt. Then, as explained, when the handle is in its properly-attached position the mechanism above described is controlled by rocking the handle in one direction or the other without moving the handle laterally. This handle-bar 22 may be of the form as shown in Fig. 11 to operate the short shaft 17 by a vertical instead of rock movement of the handle-bar. For this purpose adjustment of the controller should be in such direction that the short shaft 17 will be at right angles to that shown in Figs. 1 and 9, or transversely instead of longitudinally of the vehicle, and thereupon, as shown in Fig. 11, the shaft 17, having a square shoulder formed upon its end, has carried thereupon the handle-bar, one of whose ends is formed to have a fit upon said shoulder and is provided with a latch-bolt with a spiral or other spring to prevent endwise movement of the handle-bar when in its position, as shown. The operation of this handle will thus be a swing horizontally to the right or left to operate hollow shaft 14 and a vertical throw to operate the vertical shaft 13. To remove the handle-bar to carry same away or to provide clearance for access to or egress from the vehicle, the spring engagement of handle will be released and the handle drawn off. The steering is also done by this same handle by swinging it to the right or left, as the case may be, through the medium of the hollow shaft 14 and associated mechanism, now to be described. The forward axle is stationary, it being secured rigidly to the frame, frame-spring, or front bolster of the vehicle, or otherwise, as the case may be. The outer ends of this axle are preferably bifurcated, as indicated in Figs. 1 and 6, and between these ends the shanks 26 26 of the wheel-spindles 27 27 are pivoted from the vertical pins 28 28, whereby they are capable of being turned forwardly and rearwardly and effecting thereby a running direction to the right or to the left. The spindles 27 27 are mounted in the hubs of the forward or steering wheels 3 3. By turning these spindles on their pins 28 28 the wheels are turned and the vehicle is directed in a straight course or to the right or left. The means for accomplishing this and for locking the wheels in the position placed so they will not turn accidentally in consequence of one wheel striking a stone or other obstruction, whereby the vehicle might be overturned or caused to deviate from its proper course or the operator be required to keep his hand on the handle at all times, are provided as follows: As previously stated, the hollow shaft 14 is capable of turning axially. On its lower end this shaft has affixed a worm or worm-wheel 29. A fixed box 30 embraces this worm and prevents the shaft from moving endwise. Worm-gear 31 is supported in boxes 30 and 32, as shown in Fig. 5, and this is rocked and locked by the worm 29, which is in engagement with it. A depending arm 33 is secured to worm gear or shaft 31, and from it rods 34 34 extend outwardly in both directions to the rearwardly-projecting lugs 35 on the shanks 26. The operation of this part will be readily understood. The turning of the hollow shaft 14 in one direction or the other causes the shanks 26 26 to turn on the pins 28 28, carrying with them the steering-wheels 3 3. The worm-gear is of that peculiar construction that it becomes practically or to all intents locked when stationary against any accidental movement, and consequently the steering-wheels when set remain so until changed by the act of the operator. To present greater engaging surface between the worm and gear-wheel, the teeth of said gear may be curved to pass farther about the worm. It is, however, intended that this worm-gear mechanism shall in its construction be of such suitable form and pitch as will substantially meet the requirements considered connectively with its adoption.

When it is desired to operate with a worm having but little incline or to effect a short throw of the handle-bar in steering, either or both, I have provided therefor by the arrangement shown in Fig. 13. As will be therein seen, the worm 29$^a$, instead of being about the lower part of the hollow shaft 14$^a$, is carried upon or forms part of another shaft 80, which may be carried or supported in any appropriate way on bearings. At one end of this worm or worm-shaft 80 is carried a pinion 81, having meshing engagement with another pinion 82, which, if preferred, may be the segment of a gear carried upon or about the hollow shaft 14$^a$, the pinion 82 being of a diameter or radius greater than pinion 81. Like the worm-shaft 80 the hollow shaft 14$^a$, carrying the greater-diameter pinion 82, may be supported or borne in any appropriate way or manner, and both shafts 14$^a$ and 80 are designed to have a free rotary or rocking action imparted to them, being at the same time secured against endwise movement or displacement. Comparison of this construction with that wherein the worm 29 is carried by the hollow shaft 14 and the objects obtainable, as set forth, will be apparent. In this arrangement also, as in the one hereinbefore described, the slide-rod 13 is operated through the handle-bar 22 to operate or rock the rod 13. Instead of the spur-pinions shown in Fig. 13 bevel-gears may be substituted, accordingly as these may better serve than the spurs, when a variation of the shown construction is preferred.

In connection with this steering mechanism I have provided mechanism for controlling the rear or drive wheels, so that the pivotal wheel in the turning of a curve is unclutched from the rear axle 2 and rendered idle. This mechanism may be employed or not, as desired, and when used it is operated simultaneously with the turning of the forward or steering wheels. The following is the mechanism for accomplishing this: A pair of drums 36 36 are loosely mounted one on each end of the rear axle. These drums turn in bearings formed in the body or frame of the vehicle, and to their extreme outer ends the rear or propelling wheels 3$^a$ 3$^a$ are connected. These rear or propelling wheels are normally locked to the axle by a clutch mechanism 37 and 38, such as was alluded to in connection with drums 4 and 5. Connected with these clutches are the bell-crank levers 39 and 40. Said levers are fulcrumed at some convenient position on the frame or body of the vehicle, as at 41. Rods 42 42 extend forwardly from the inner ends of these bell-crank levers, with which they are pivotally connected, to a point near the extreme forward end of the vehicle. Here they are pivotally connected to the outer ends of levers 43 43, and the latter are fulcrumed at 44. These levers 43 43, which may be of any suitable form, are provided with slots of peculiar construction having straight sides and curved sides. The direction of the straight slots may be at such angle to the curved slots as location of the slotted levers and nature of the duties required of them (relatively as to speed of their operativeness and length of thrust to be imparted by the slots' thrust-engaging sides) may warrant. The vertical shaft 14 is provided with two arms 46 46, projecting from said shaft in opposite directions, and they are provided with wrists 47 47, which enter the slots 45 45, the arrangement being such that they are normally stationed at the angle formed by the juncture of the two members of the slot. The object of the special formation of these slots is to provide clearance for the forwardly-moving wrist, so it will not operate the lever with which it is connected, while the rearwardly-moving wrist is operating as a cam in the straight portion of the slot in which it is located for the purpose of swinging the lever and moving the attached rod 42 forward to unclutch the drum located at its rear end. It will be observed that in consequence of this peculiar construction only one of these clutches is operated at a time, and the one operated is always the one in rear of the rearward cramped steering-wheel in turning, thus rendering that wheel idle, so it acts as a pivot, while the axle continues to turn freely in its hub and the wheel at its other end travels on in the arc of a circle. When the vehicle is turned in the opposite direction, the reverse action takes place and the other propelling-wheel becomes the pivot and the former pivot-wheel the traveler.

The worm mechanism 29 and 31, previously alluded to, not only locks the steering-wheels wherever they happen to be placed, but also it likewise locks the mechanism just described, and it may be added that no matter how slight the turn of this vehicle, whether it be to pass another vehicle on the road or to turn around, the effect is the same upon the rear or propelling wheels—that is to say, the one on the inner side of the curve will always correspond to become idle and the one on the outside remain active—and it is only when the vehicle is traveling in a straight line that both are equally active, which operation is of course the normal condition.

The vehicle shown in the drawings is equipped with two brake mechanisms, either one or both of which may be utilized. One brake operates in connection with the rear wheels and the other in connection with the drums 36 36 on the rear axle 2. These will now be described in the order mentioned. A transverse rock-shaft 48 is mounted to rock in boxes 49 49, located beneath the body of the vehicle. This shaft has the usual brake-shoes connected with its outer ends in position to bear against the rear or propelling wheels. This shaft has a worm-gear 50 thereon. A short vertical shaft 51 is provided with a worm 52, which engages this worm-gear 50 to turn to rock shaft 48 when it is desired to apply the wheel-brakes. This vertical shaft is furnished with two crank-arms 53 and 54, one above the other. A link 55 extends forward from the lower of these arms to a similar arm on the brake-operating shaft 56, and a foot or other lever 57 is secured on this operating-lever whereby to operate it. The worm-gear mechanism operates the same in connection with the brake as with the steering to lock the brakes wherever they are placed, so that it is unnecessary for the operator to keep his foot on the lever 57 after it has been once turned to the proper position to apply or remove the brakes. The other brake mechanism is preferably connected with this wheel-brake mechanism in some manner, so they may be applied simultaneously when both are employed. It is for this purpose that the upper crank-arm 53 is used. The numerals 58 and 59 represent the drum-brakes. These are arranged in pairs, one each of a pair being pivoted above and the other below and both forward of the drum 36, in connection with which they operate. These brakes are controlled by the double screws 60 60, which are swiveled in the frame of the machine. Collars 61 61 are mounted on the opposite ends of these screws. These collars have pintles 62 62 projecting laterally therefrom, and said pintles operate in slots 63 63 in the shanks 64 64 of the drum-brakes. As the double screws are turned the drum-brakes are operated to grip or release the drums. The two screws are connected by connecting-bar 65, which extends from one arm 66, projecting from one screw, to arm 67, projecting from the other screw, so that the two operate together. One of these screws is also provided with an arm, and a link 68 extends from this arm to the arm 53 on shaft 51. In this way all four brakes are connected together and of course operated simultaneously. As stated, it is not absolutely necessary that these brakes should all be employed or connected together, and they might be varied to a considerable extent, and to disconnect them it is simply necessary to detach the link or bar 68; and it is further pointed out that while the vehicle may be constructed to embrace either one or both the brake mechanisms, so, also, may they be divided, as one brake-shoe to a drive-wheel and one brake for a drum, or these together, or, omitting the brakes from the drive-wheels altogether, the brakes therefor may be disposed to operate when required upon peripheries of fly-wheels carried by motor, (not shown,) and, again, by employing but one brake for each of the drums instead of two brakes, each as shown. In this latter case the worm-screw may be single instead of double, with only one pintled collar, and the brake caused to operate upon the upper or under side of the drums, as desired, and it will also be understood how the screws, pintled collars, brakes with shanks, rod 65, connecting the screws, and link 68 for braking with the drums may be dispensed with and the mechanism for braking with the drive-wheels be moved back and so disposed as to act upon the drums instead of the drive-wheels, the shaft 48 being shortened and the link 55 lengthened to facilitate this.

In addition to the several features described I have devised means for cooling the water used in the jacket around the cylinder of the explosive-engine, which I prefer to generally use in connection with my vehicle. I have shown two or three different plans by which this cooling of the water may be accomplished, and first I show a water-tank $68^a$, which may be placed immediately in front or in rear of the dash or may take the place of the dash. A number of air-tubes 69 69 extend through this tank from top to bottom, having their ends opening outside the tank. A hood 70 is formed about the upper end of the dash or tank and opens forward to catch the air as the vehicle travels forward and deflect it downward through these tubes. A depending apron 71 at the lower end prevents, or aids to prevent, the air from ascending at that point. Obviously the positions of the hood and apron could be transposed to effect air circulation from the bottom upward, instead of from the top downward; and as it may often prove an advantage to have the circulating air free from dirt or foreign matter—as, for instance, when the operating mechanism, motor, &c., is to be inclosed away from dust and a circulation of air to transpire through said inclosure and to obtain through the hood—I have designed that the hood may be provided with a screen to intercept gross or foreign substances of an objectionable nature from entering said circulation; and as the hood, so the apron may have thereabout such proper screens.

Although I have shown the tank as supplemental to the dash, and therefore with its pipes or passages in a position vertical, it by no means follows that this position be arbitrarily adhered to; but, to the contrary, I have designed that upon preference therefor the tank may be disposed from a vertical to a horizontal position, as at right angles to that shown, so that the pipes or passages will be in a longitudinal line with the vehicle, and therefore the tank may be arranged to come under the floor of the vehicle-body below the feet of the occupants or form a part of said floor. The hood could thereupon be dispensed with, but would be preferably retained, with its narrow end incasing outer end of tank and its wider flaring end projecting forwardly to collect air and augment circulation thereof. With this described arrangement the apron may be omitted. The water may be taken from this tank in any convenient manner, as by a pipe 72, leading from the lower side of the tank, where the water is of course the coolest. This pipe may be given a circuitous course, as indicated by the coils at 73, so as to extend the cooling-surface by the exposure of a great length of the pipe to the freely-circulating air about it. The water is returned after leaving the jacket around the engine-cylinder and discharged into the top or upper side of the tank $68^a$, where it is cooled and again used, this circulation continuing during the operation of the motor.

In Fig. 10 I have shown another form of water-cooler employed in connection with the system first described. This may be used in connection with either or both of the other systems or, like either of them, may be used independently. When used in connection with the system first described, the water taken from the bottom of tank $68^a$ is discharged through pipe $73^c$ into one end of the cooler $73^a$ and circulated through the pipes therein and then out through pipe 74, and after it has been used it returns to the water-tank $68^a$ through return-pipe 75, and so it circulates. Dispensing with tank $68^a$, the hot water enters through pipe $73^b$, (indicated in dotted lines,) and after passing through cooler $73^a$ passes out through pipe 74. In this form of cooler the water is cooled by the air surrounding the cooler, and the cooler, being located under the floor of the vehicle, radiates its heat at that point, (if there be any,) and thus the water-cooler may be utilized as a foot-warmer at the same time it serves as a cooler.

It is evident that many slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a vehicle, the combination with an axle, wheels, and means for clutching these wheels to the axle, of shaft having laterally-projecting arms, pivoted levers having slots therein, pins projecting from the arms into the slots, bell-crank levers, and rods connecting the bell-crank levers with the slotted levers, substantially as set forth.

2. In a vehicle, the combination with a steering-wheel having an outwardly-projecting arm extending from its axle, of a pair of shafts extending at an angle to each other, one having a worm and the other a worm-gear intermeshed with each other, one shaft having a handle thereon by which it is turned and the other provided with an arm, and a rod extending from the latter to the arm on the wheel-axle.

3. In a vehicle, the combination with two steering-wheels, pivoted axles on which these wheels turn, and an arm projecting outwardly from each axle, of a pair of shafts disposed at an angle to each other, one provided with a worm and the other with a worm-gear, the two intermeshed, one of these shafts having a handle thereon whereby it is manipulated and the other provided with an outwardly-extending arm, and rod extending from this arm in both directions to the arms on the axles, whereby both steering-wheels are operated simultaneously by turning the handle in one direction or the other.

4. In a vehicle, the combination with a propulsion-axle drums thereon, and belts, ropes or chain extending from these drums to some propelling device, one of said belts crossed, of clutch mechanism for controlling these drums, and means for operating said mechanism from the operator's station on the vehicle, substantially as set forth.

5. In a vehicle, the combination with a hollow shaft, and a slide therein, of a removable handle for rocking or swinging one shaft and sliding the other, pivotally secured to its support in such manner that the handle may be raised or lowered without effecting necessarily, operation of the hollow shaft, or of the slide-shaft.

6. In a vehicle, the combination with a rock-shaft having brake-shoes thereon, and a worm-wheel on said shaft, of a shaft extending at right angles thereto and having a worm thereon which engages directly with the worm-wheel on the rock-shaft, substantially as set forth.

7. The combination with a vehicle, of an air-passaged cooling-tank serving also as a dash and provided to effect collection and circulation of air through the tank.

8. In a vehicle, the combination with a rock-shaft located in proximity to the operator to be operated in controlling the movements of the vehicle, of a removable handle pivoted to this shaft, and a catch for locking the handle, substantially as set forth.

9. The combination with a vehicle, of an air-passage cooling-tank, serving also as a dash and of a hood located at one end thereof, and an apron at the other end to provide for collection and circulation of air.

10. In a vehicle, the combination with a drive-axle, wheels and drums thereon, and screws meshing with collar, of a brake, having a slotted shank engaging with collar carried by screw, for forcing brake in or out of braking engagement.

11. The combination with a drive-shaft, drive-wheels loose thereon, and a controller, of levers provided with slots, having straight and curved sides, the latter in the arc of a circle whose center is the controller, and means connecting said levers with the controller and drive-wheel mechanism, to facilitate bringing of drive-wheel in or out of driving engagement.

12. In a vehicle, the combination with a propelling-shaft, drive-wheels loose thereon, and clutch mechanism for each wheel, of a controller, arms connected therewith, wrists on these arms, levers having curved slots therein, extending in one direction and in the arc of a circle whose center the controller is, and rods extending from these levers to the clutches.

13. In a vehicle, the combination with an axle, wheels loose thereon, steering-wheels, and a controller, of mechanism for operating with the loosely-mounted wheels and the steering-wheels and having worm-gear mechanism intersecting or interposed thereupon whereby to prevent unfavorable movement of the parts connectively concerned with the worm-gear mechanism, and to lock, hold, or effect retention of the said parts, in such position, or release therefrom as occasion may require.

In testimony whereof I have signed this specification in the presence of two subscribing witnesses.

WILLIAM WALLACE GRANT.

Witnesses:
WILLIAM J. LYNCH,
WILLIAM FERRIS.